United States Patent [19]

Yamazaki et al.

[11] Patent Number: 5,274,486
[45] Date of Patent: Dec. 28, 1993

[54] DEVICE FOR HOLDING LIQUID CRYSTAL DISPLAY PANEL

[75] Inventors: Hideaki Yamazaki, Yokohama; Tetsuo Matsumura, Tokyo; Susumu Otsuki, Yamato, all of Japan

[73] Assignee: Matsushita Electric Industrial Co., Ltd., Osaka, Japan

[21] Appl. No.: 962,356

[22] Filed: Oct. 16, 1992

[30] Foreign Application Priority Data

Oct. 31, 1991 [JP] Japan ................................. 3-285906

[51] Int. Cl.$^5$ ............................................. G02F 1/133
[52] U.S. Cl. ............................................................ 359/83
[58] Field of Search ............................................. 359/83

[56] References Cited

U.S. PATENT DOCUMENTS

| 4,367,467 | 1/1983 | Emile, Jr. | 359/83 |
| 4,422,728 | 12/1983 | Andreaggi | 359/83 |
| 4,727,285 | 2/1988 | Taniguchi | 359/83 |
| 5,182,660 | 1/1993 | Tanaka | 359/83 |

FOREIGN PATENT DOCUMENTS 63-198  1/1988  Japan .
2234128 1/1991  United Kingdom .

Primary Examiner—William L. Sikes
Assistant Examiner—Huy Mai
Attorney, Agent, or Firm—Stevens, Davis, Miller & Mosher

[57] ABSTRACT

A cover is introduced onto a holder, substantially perpendicular to the holder by guides which hold a liquid crystal display panel on the holder so that the liquid crystal display panel is displaceable only in a direction substantially perpendicular to the holder, then the cover is set on the holder with the liquid crystal display panel being interposed therebetween. The introducing end parts of stoppers projected from the cover are introduced into lock means provided to the holder so that convex parts formed by the introducing end parts are locked resiliently by the lock means. During assembly, the cover is moved only in a direction perpendicular to the display surface of the liquid crystal display panel with substantially no movement along the display surface thereof, thereby it is possible to prevent the display surface of the liquid crystal display panel from being damaged.

7 Claims, 4 Drawing Sheets

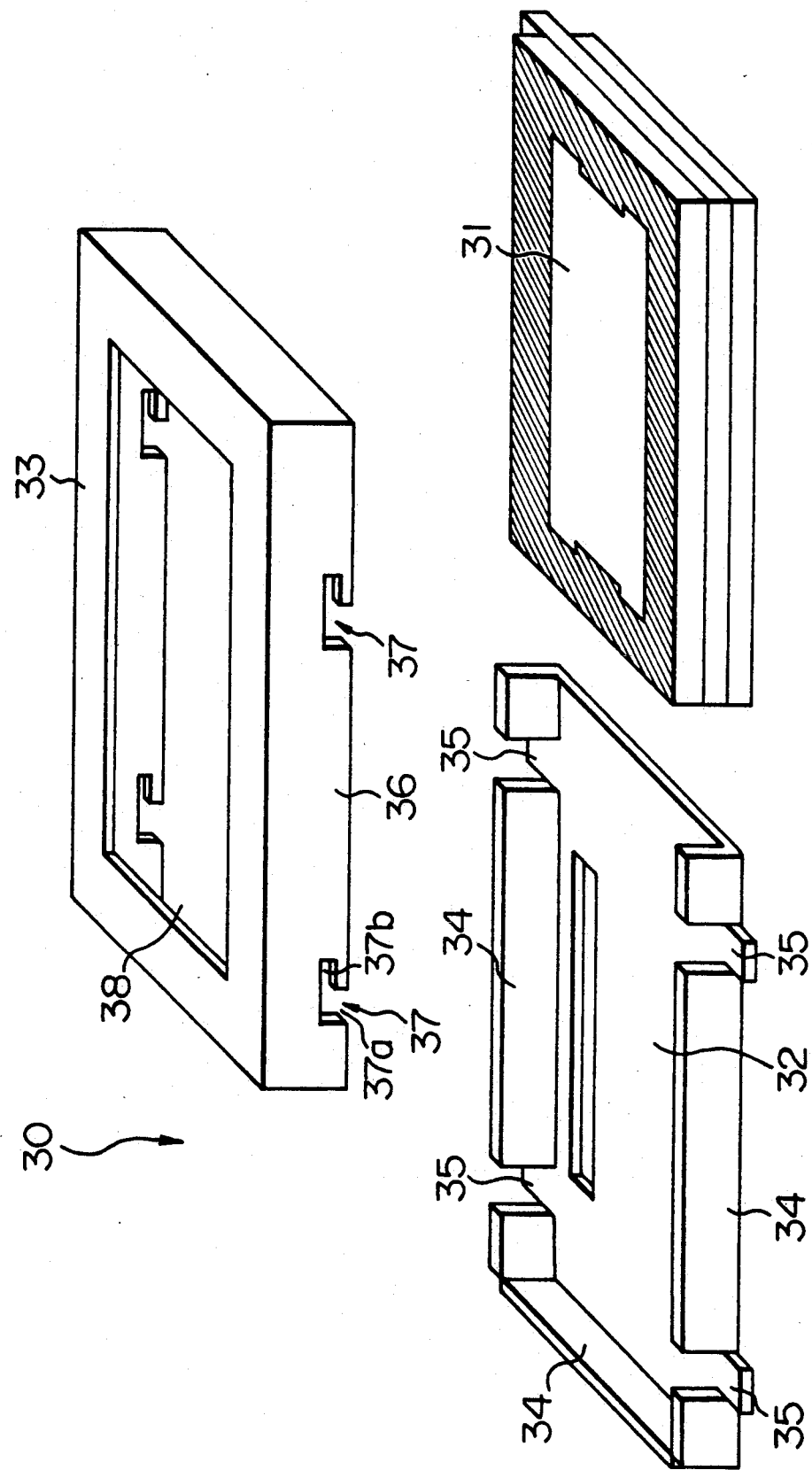

DEVICE FOR HOLDING LIQUID CRYSTAL DISPLAY PANEL

BACKGROUND OF THE INVENTION

The present invention relates to a device for holding a liquid crystal display panel adapted to be used in a miniature electronic apparatus or the like.

DESCRIPTION OF RELATED ART

As shown in FIGS. 3 and 4, a heretofore-used device 30 for holding a liquid crystal display panel of this kind has a holder 32 and a cover 33. The holder 32 is formed, at its sides excepting the right side, guide parts 34 in the form of an upright wall, that is, front and rear guides and left guide, the front and rear guides being provided on their both sides with fitting lock stoppers 35 each of which is formed by cutting and bending one part of the fitting lock stopper 35.

The cover 33 has a top wall part and four side wall parts 36, that is, front and rear walls, and left and right wall which are formed at its four side edges of the top wall. Each of the front and rear wall parts 36 of the cover 33 is formed therein a fitting slot 37 having a vertical slot part 37a and a horizontal slot part 37b, and the top wall of the cover 33 is formed therein with an opening 38.

Further, a liquid crystal display panel 31 is fitted in the holder 32, and then the cover 33 is set over the holder 32 while the fitting lock stoppers 35 of the holder 32 are introduced into the vertical slot parts 37a of the fitting slots 37 of the cover 33, and then the cover 33 is shifted horizontally so as to fit the fitting lock stopper 35 into the horizontal slot part 37b of the fitting slots 37, respectively. Accordingly, the liquid crystal display panel 31 is held in the holding device 30.

However, with the above-mentioned holding device 35 in which the fitting lock stoppers 35 of the holder 32 are introduced into the vertical slot parts 37a of the fitting slots 37 of the cover 33 when the cover 33 is fitted onto the holder 32, and then the cover 33 is shifted horizontally in order to fit the fitting lock stoppers 35 into the horizontal slot parts 37b of the fitting slot 37, there has been raised a disadvantage in that the cover 33 scratches the outer surface of the liquid crystal plate 31 so as to damage the outer surface thereof. Further, the horizontal shift motion of the cover inevitably require an extra space around the holder 32 in order to assemble the cover 33 onto the holder 32 since the cover 33 is shifted horizontally, relative to the holder 32 upon locking thereof, causing the efficiency of mounting other components onto a miniature electronic apparatus to be lowered.

SUMMARY OF THE INVENTION

The present invention is devised in order to eliminate the above-mentioned disadvantages, and accordingly, one object of the present invention is to provide a device for holding a liquid crystal display panel, which prevents the liquid crystal display panel from being damaged upon assembling the cover onto the holder with no substantially extra space for locking the cover to the holder being required, and which can enhance the efficiency of mounting components around the liquid crystal display panel onto a miniature electronic apparatus.

To the end, according to the present invention, there is provided a device for holding a liquid crystal display panel having a display section, comprising a holder for holding the liquid crystal panel; a guide means provided on the holder, for guiding the liquid crystal panel only in a direction substantially perpendicular to the holder upon insertion of the liquid crystal display panel and for holding the same; a cover body adapted to be guided by the guide means so that the cover body can move only in a direction substantially perpendicular to the holder; an opening formed in the cover body and aligned with the display section of the liquid crystal panel held on said holder; and a lock mechanism for locking the cover body assembled to the holder after said cover body is guided, substantially perpendicular to the holder; further, the locking mechanism comprising: a plurality of stopper means projected from the cover body toward the holder, outside of the opening and each provided with an introducing end part formed with a convex part; and a plurality of lock means for receiving the introducing end parts of the stopper means so as to lock the convex parts of the stopper means.

With this arrangement, when the cover body is assembled to the holder, the cover body is fitted thereonto only in a direction substantially perpendicular to the display surface of the liquid crystal display panel, and it holds the liquid crystal display panel, perpendicular to the liquid crystal display panel, thereby it is possible to prevent the display part of the liquid crystal display panel from being damaged. Further, in addition to the above-mentioned arrangement, the introducing end part of the stopper means projected from the cover body are introduced and locked into the lock means provided to the holder, substantially perpendicularly to the display part of the liquid crystal panel, and accordingly, no extra space for assembling the holding device is required around the liquid display panel, thereby it is possible to enhance the efficiency of mounting components around the liquid crystal display panel.

The present invention will be explained in detail with reference to the accompanying drawings in which:

BRIEF DESCRIPTION OF THE DRAWINGS

FIGS. 2a to 2c are side views showing the steps of assembling the holder devices shown in FIG. 1, among which FIG. 2a shows that the liquid crystal display panel is set on a holder before a cover is fitted onto the holder, FIG. 2b shows that the cover body is fitted onto the holder, and FIG. 3 shows that the cover is locked to the holder;

FIG. 3 is a perspective view illustrating a device for holding a liquid display panel of related art, the holding device being shown in a disassembled condition.

DESCRIPTION OF PREFERRED EMBODIMENT OF THE INVENTION

Figure 1:
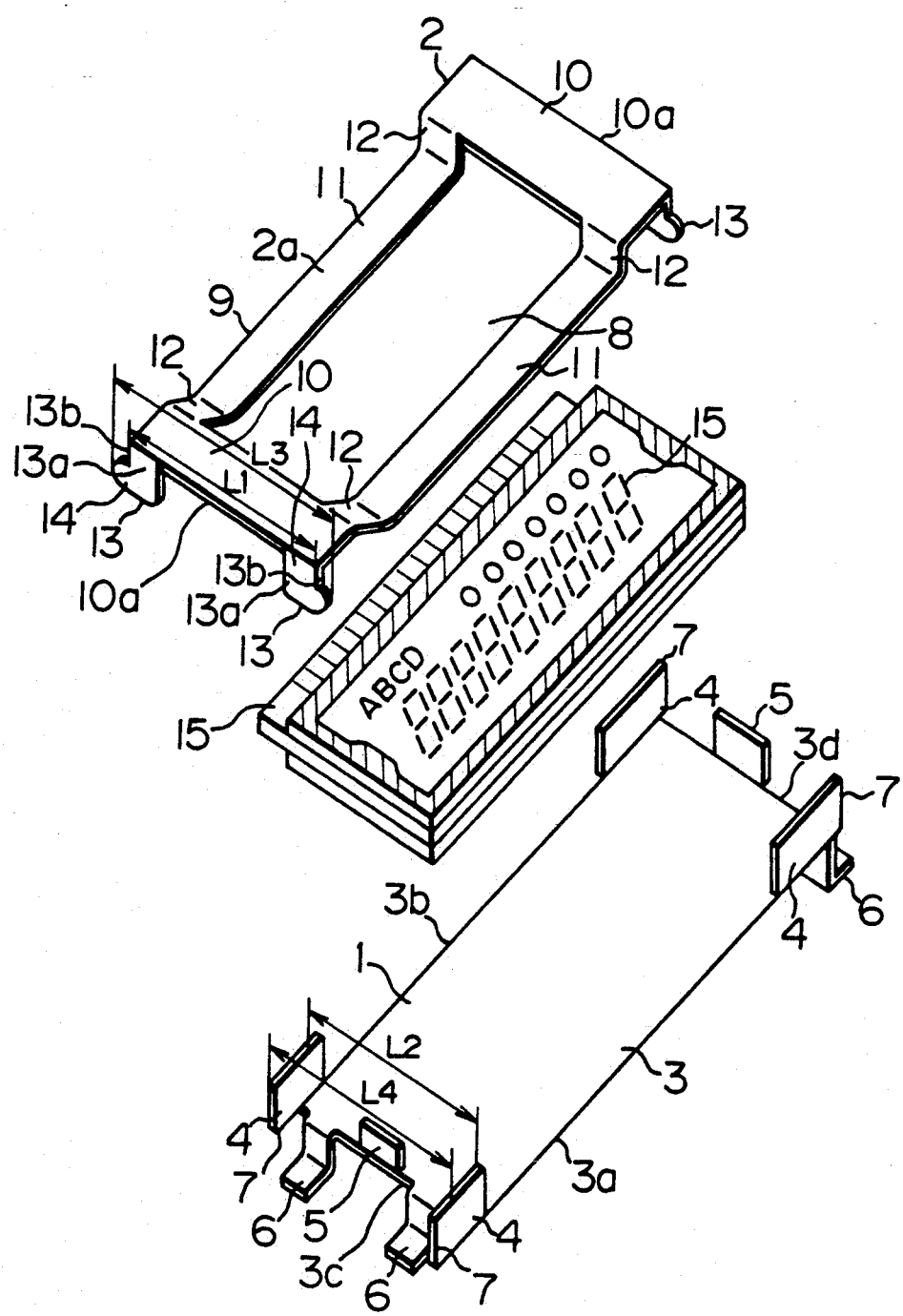
FIG. 1 is a perspective view illustrating a device for holding a liquid crystal display panel in one embodiment form of the present invention, the device being shown in a disassembled condition.
Figure 2A:
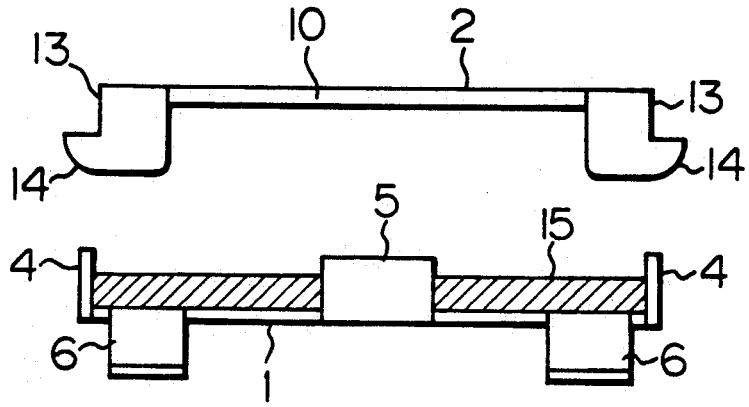
Figure 2B:
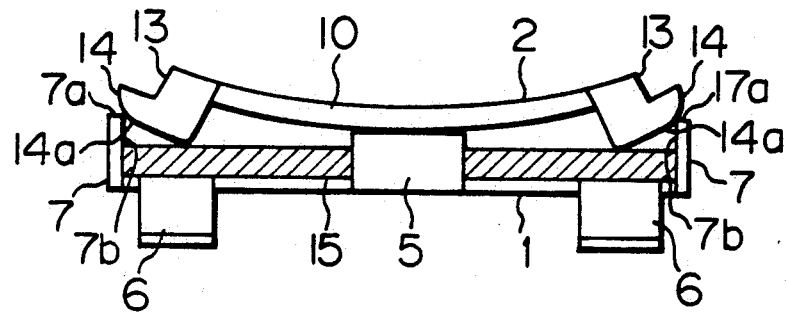
Figure 2C:
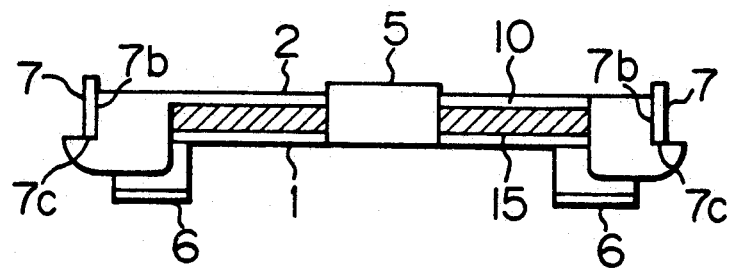
Figure 4:
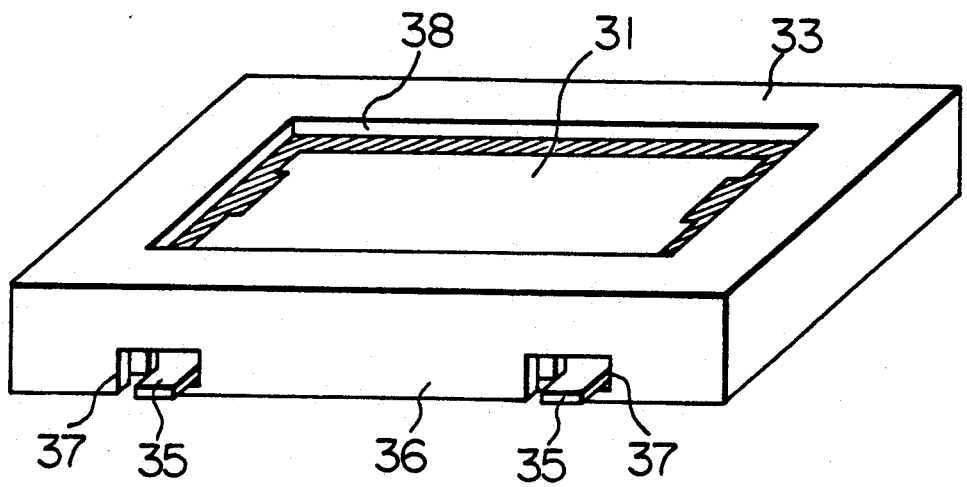
FIG. 4 is a perspective view illustrating the holding device shown in FIG. 3 in an assembled condition.

Explanation will be hereinbelow made of a preferred embodiment of the present invention with reference to FIGS. 1 and 2a to 2c. FIG. 1 is a perspective view in which the holding device is shown in a disassembled condition, and FIGS. 2a to 2c show the steps of assembling the holding device.

Referring to FIG. 1, the holding device comprises a holder 1 and a cover 2. The holder 1 has a planar rectangular holder body 3 which is formed at each of its left and right ends with a pair of longitudinal guide parts 4, a lateral guide part 5 and a pair of leg parts 6. That is, the longitudinal guide parts 4 are formed by raising the front and rear edge parts 3a, 3b of the left and right side parts of the holder 3, and the outer parts of the guide parts 4 are projected outward from the left and right edge parts 3c, 3d of the holder body 3. These projected outer parts serve as locking parts 7. Further, the lateral guide parts 5 are formed by raising the left and right edge parts of the holder body 3 at the center thereof, and the leg parts 6 are directed downward from the left and right edge parts 3c, 3d of the holder body 3.

The cover 2 has a frame-like cover body 9 formed in its surface part with a rectangular opening 8. Stopper holding parts 10 are formed on the left and right sides of the cover body 9. Further, the front and rear end parts between which the opening 8 is formed, are depressed stepwise so as to form retaining parts 11 for a liquid crystal display panel. The bridging parts between the left and right edges of the retaining parts 11 and the stopper holding parts 10 serve as a resilient holding parts 12. Further, fitting lock stoppers 13 are formed at the front and rear ends of the outer edge parts 10a of each of the stopper holding parts 10. Each of these fitting lock stoppers 13 is formed of a root part 13a having an introducing end part 14 including a convex part which is projected outward. The distance L1 between the outer edges 13b of the root parts 13a of the fitting lock stoppers 13 is set to be shorter than the distance L2 between the inner surfaces of the guide parts 4 of the holder 1 while the distance L3 between the introducing end parts 14 of the fitting lock stoppers 13 is set to be longer than the distance L4 between the outer surfaces of the guide parts 4 of the holder. A locking mechanism is constituted by the lock parts 7 and the fitting lock stoppers 13. Further, the liquid crystal display panel 15 is set on the holder 1, and then the cover 2 is fitted on the holder 1 with the liquid crystal display panel 15 being held therebetween. That is, as shown in FIG. 2a, at first the liquid crystal display panel 15 is set on the holder 1 so that the longitudinal guide parts 4 prevent the liquid crystal display panel 15 from horizontally moving in its longitudinal direction while the lateral guide parts 5 prevent the same from horizontally moving in its lateral direction. Then, as shown in FIG. 2b and 2c, the cover 2 is fitted onto the holder in a direction perpendicular to the display surface of the liquid crystal display panel 15 so that the lower edges 14a of the introducing end parts 14 of the fitting lock stoppers 12 of the cover 2 abut against the upper edges 7a of the lock parts 7 of the longitudinal guide parts 4. When the cover 2 is pressed, the cover 2 is curved so that the introducing end parts 14 of the fitting lock stoppers 13 slide along the upper edges 7 and the inner surface 7b of the lock parts 7 of the guide parts 4, and enters below the lower edge 7c of the lock parts 7, that is, the introducing end parts 14 of the fitting lock stoppers 13 are engaged and locked by the lock parts 7. Thereafter, the cover 2 is returned to its original condition from its deformed condition while its retaining parts 11 retain and hold the liquid crystal display panel 15.

The return of the cover from the deformed condition into the original condition can be smoothly made since the distance L1 between the outer edges 13b of the root parts 13a of the fitting lock stoppers 13 is set to be shorter than the distance L2 between the inner surfaces of the guide parts 4 of the holder 1, and substantially no extra horizontal space is required for the deformation of the cover 2.

According to the arrangement of the above-mentioned embodiment, when the cover 2 is fitted onto the holder 1, the cover 2 is introduced to the holder 2 in a direction substantially perpendicular to the display surface of the liquid crystal display panel 15 so as to hold the liquid display panel in the same direction, and accordingly, it is possible to prevent the liquid display panel 15 from being damaged. In addition to the above-mentioned arrangement, the introducing end parts of the fitting lock stoppers 13 provided to the cover 2 are introduced below the lower edges 7c of the lock parts 7 by way of the upper edges 7a and the inner surfaces 7b of the lock parts 7 provided on the holder 1, and are therefore locked by the lower edges 7c of the lock parts 7. Accordingly, substantially no horizontal extra space around the liquid crystal is required for the operation of the locking mechanism, thereby it is possible to enhance the efficiency of mounting components around the liquid crystal display panel.

As mentioned above, according to the present invention, when the cover is fitted onto the holder, the cover is introduced to the holder in a direction substantially perpendicular to the display surface of the liquid crystal display panel so as to hold the latter in the same direction, and accordingly, it is possible to prevent the liquid crystal display panel from being damaged. In addition to this arrangement, the introducing end parts of the fitting lock stoppers provided to the cover is introduced below the lower edges of the lock parts provided on the holder by way of the upper edges and the inner surface of the lock parts so as to be locked by the lower edges of the lock parts, and accordingly, the horizontal area occupied by the lock mechanism does not vary substantially during operation of the lock mechanism, that is, substantially no extra space is required for operation of the lock mechanism, thereby it is possible to enhance the efficiency of mounting components around the liquid crystal display panel.

What is claimed is:

1. A device for holding a liquid crystal display panel having a display section, comprising:
   a holder for holding the liquid crystal panel;
   a guide means provided on said holder, for guiding the liquid crystal panel only in a direction substantially perpendicular to said holder upon insertion of the liquid crystal display panel and for holding the same;
   a cover body adapted to be guided by said guide means so that said cover body can move only in a direction substantially perpendicular to said holder upon assembly of said cover body onto said holder;
   an opening formed in the cover body and aligned with said display section of said liquid crystal panel held on said holder; and
   a lock mechanism for locking said cover body assembled to said holder after said cover body is guided, substantially perpendicular to said holder;
   further, said locking mechanism comprising:
   a plurality of stopper means projected from said cover body toward said holder, outside of said opening and each provided with an introducing end part formed with a convex part; and a plurality of lock means for receiving said introducing end parts of said stopper means so as to lock said convex parts of the stopper means.

2. A device for holding a liquid crystal panel as set forth in claim 1, wherein said stopper means are resilient.

3. A device for holding a liquid crystal panel as set forth in claim 2, wherein each said lock means has a plate-like piece which engaged and locks said convex part of said associated stopper means at one edge thereof remote from said liquid crystal display panel.

4. A device for holding a liquid crystal panel as set forth in claim 3, wherein said plate-like piece is resilient.

5. A device for holding a liquid crystal panel as set forth in claim 3, wherein said cover body is formed of a resilient plate having both side parts which are raised stepwise, said opening being formed between said side parts and said stopper means being provided at both ends of each of said side parts, whereby said liquid crystal display panel is resiliently pressed against said holder.

6. A device for holding a liquid crystal panel as set forth in claim 5, wherein the resiliency of said stopper means is obtained by the resiliency of the said side parts.

7. A device for holding a liquid crystal panel as set forth in claim 6, wherein the convex parts of the stopper means are projected outward, and said plate pieces are provided outside of said stopper means.

* * * * *